(12) United States Patent
Michener et al.

(10) Patent No.: US 7,735,111 B2
(45) Date of Patent: Jun. 8, 2010

(54) MERGING OF MULTIPLE ENCODED AUDIO-VIDEO STREAMS INTO ONE PROGRAM WITH SOURCE CLOCK FREQUENCY LOCKED AND ENCODER CLOCK SYNCHRONIZED

(75) Inventors: James A. Michener, Grass Valley, CA (US); Leon J. Stranger, Farmington, UT (US)

(73) Assignee: The DIRECTV Group, Inc., El Segundo, CA (US)

( * ) Notice: Subject to any disclaimer, the term of this patent is extended or adjusted under 35 U.S.C. 154(b) by 1031 days.

(21) Appl. No.: 11/118,926

(22) Filed: Apr. 29, 2005

(65) Prior Publication Data
US 2006/0248559 A1 Nov. 2, 2006

(51) Int. Cl.
H04N 7/16 (2006.01)
H04J 3/06 (2006.01)
H04B 1/66 (2006.01)
H04N 7/12 (2006.01)
H04N 11/02 (2006.01)
H04N 11/04 (2006.01)

(52) U.S. Cl. ............... 725/146; 370/503; 375/240.28

(58) Field of Classification Search ............ None
See application file for complete search history.

(56) References Cited

U.S. PATENT DOCUMENTS

| | | | | |
|---|---|---|---|---|
| 5,533,021 A | * | 7/1996 | Branstad et al. | 370/396 |
| 5,652,615 A | | 7/1997 | Bryant et al. | |
| 5,703,877 A | * | 12/1997 | Nuber et al. | 370/395.64 |
| 5,818,512 A | | 10/1998 | Fuller | |
| 5,874,997 A | | 2/1999 | Haigh | |
| 5,936,968 A | * | 8/1999 | Lyons | 370/503 |
| 5,982,452 A | | 11/1999 | Gregson et al. | |
| 6,002,687 A | * | 12/1999 | Magee et al. | 370/394 |
| 6,075,556 A | | 6/2000 | Urano et al. | |
| 6,519,283 B1 | | 2/2003 | Cheney et al. | |
| 2002/0023267 A1 | | 2/2002 | Hoang | |
| 2002/0094025 A1 | | 7/2002 | Hanamura et al. | |
| 2002/0144265 A1 | | 10/2002 | Connelly | |

(Continued)

FOREIGN PATENT DOCUMENTS

CA 2430164 A1 7/2002

(Continued)

OTHER PUBLICATIONS

International Search Report and Written Opinion dated May 15, 2008 in International counterpart Application No. PCT/US2006/016445 corresponding to U.S. Appl. No. 11/118,926, filed Apr. 29, 2005 by James Michener et al.

(Continued)

*Primary Examiner*—Andrew Y Koenig
*Assistant Examiner*—Mark D Featherstone

(57) ABSTRACT

A system and method for merging of multiple encoded audio and video streams into a single program in the transport stream enables playback of any audio stream with any video stream. This is accomplished by first locking the frequency of audio and video input streams for a plurality of different programs to a source clock, independently encoding each program with its own PCR and PTS into a program stream, multiplexing the program streams into a transport stream, and then synchronizing the PCR and PTS of the program streams to a declared master PCR.

19 Claims, 9 Drawing Sheets

U.S. PATENT DOCUMENTS

| | | |
|---|---|---|
| 2003/0058268 A1 | 3/2003 | Loui et al. |
| 2003/0090591 A1 | 5/2003 | Concion et al. |
| 2003/0135861 A1 | 7/2003 | Sinz et al. |
| 2003/0185238 A1* | 10/2003 | Strasser et al. .............. 370/473 |
| 2004/0086041 A1 | 5/2004 | Ye et al. |
| 2004/0261127 A1* | 12/2004 | Freeman et al. ............. 725/135 |
| 2006/0031914 A1* | 2/2006 | Dakss et al. ................ 725/135 |
| 2006/0146815 A1* | 7/2006 | Tse ............................. 370/389 |

FOREIGN PATENT DOCUMENTS

| | | |
|---|---|---|
| GB | 2338383 A | 12/1999 |
| JP | 2001-313936 | 11/2001 |
| WO | 02100110 A2 | 12/2002 |

OTHER PUBLICATIONS

Schirling, Peter (Editor); "Multiplexing and Synchronization"; MPEG-2 Systems white paper; International Organization for Standardization for Organisation Internaionale de Normalisation ISO/IEC/ JTC 1/SC 29/WG11 Coding of Moving Pictures and Audio; Oct. 2005; Nice, France; http://www.chiariglione.org/mpeg/technologies/mp02-m%26s/index.htm; 3 pages.

* cited by examiner

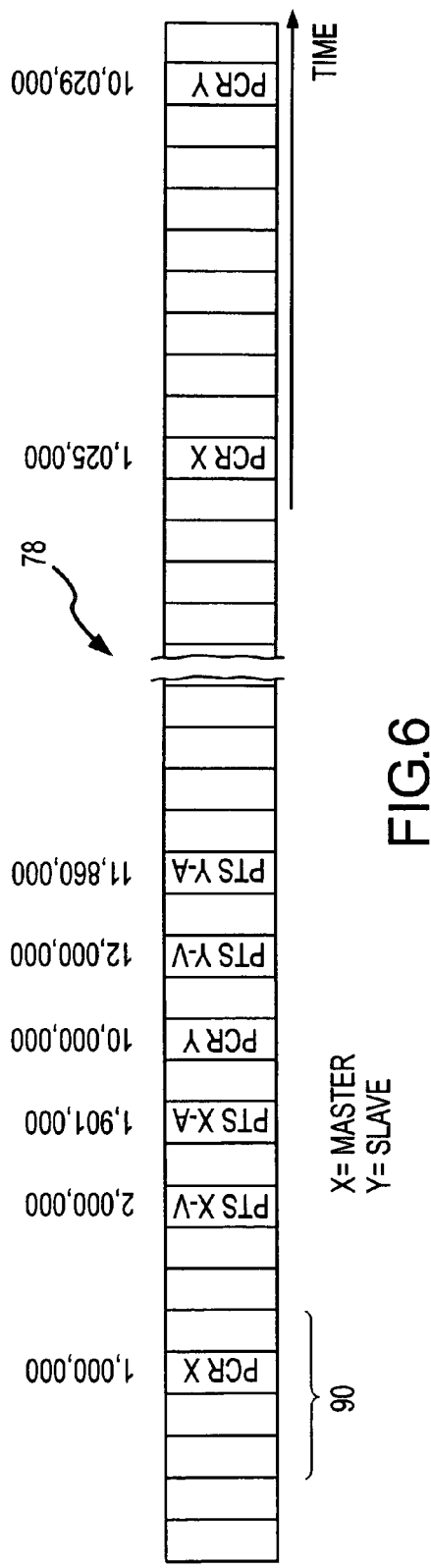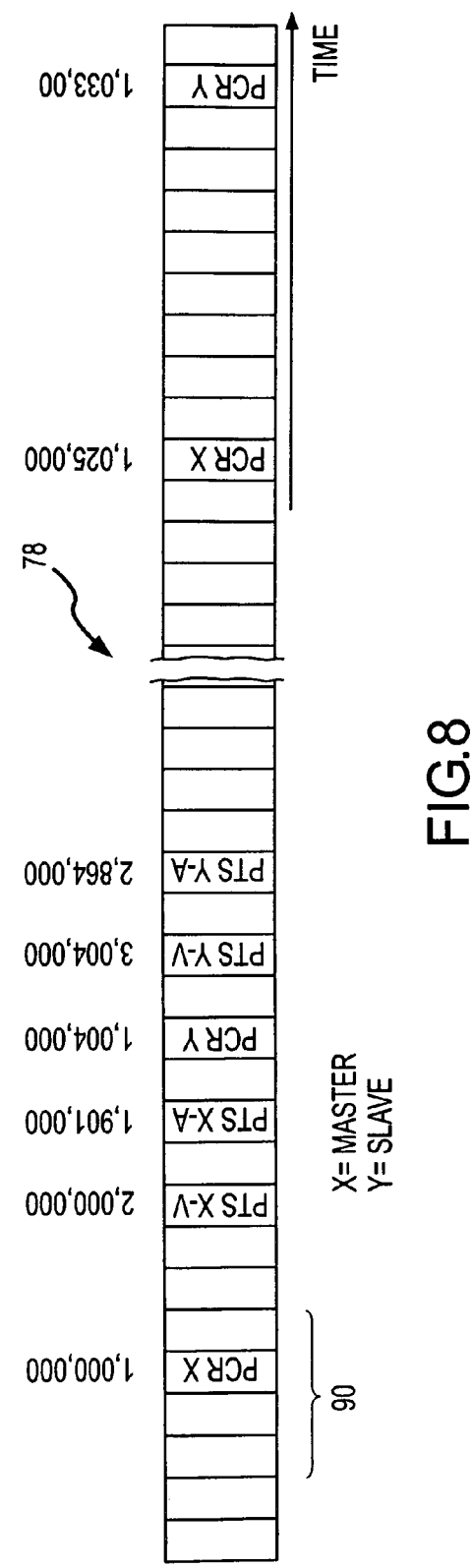

MERGING OF MULTIPLE ENCODED AUDIO-VIDEO STREAMS INTO ONE PROGRAM WITH SOURCE CLOCK FREQUENCY LOCKED AND ENCODER CLOCK SYNCHRONIZED

BACKGROUND OF THE INVENTION

1. Field of the Invention

This invention relates to the transmission of entertainment programming, and more specifically to the merging of multiple encoded audio and video streams into a single program in the transport stream to enable playback of any audio stream with any video stream.

2. Description of the Related Art

Television programs are distributed to viewers by a variety of broadcasting methods. These methods include traditional analog broadcast television (National Television Systems Committee or "NTSC" standard), the digital broadcast television "Advanced Television Systems Committee" or "ATSC" standard), cable television (both analog and digital), satellite broadcasting (both analog and digital), as well as other methods. These methods allow audio and video streams for television programming to be encoded multiplexed into a transport stream that is transmitted over a common transmission medium.

As shown in FIG. 1, the "headend" 10 of a satellite broadcast system 12 includes among other functions a traffic & scheduling center 14, a satellite broadcast center 16 and a conditional access management center (CAMC) 18. The broadcast center encodes, encrypts and multiplexes programming content, either stored or from live feeds 20, into a packetized transport stream 22 that is uplinked to satellites 24 via an antenna 26.

To view a television program on a TV 28, a subscriber may have to subscribe to a service package offered by a pay-TV service/transmission provider such as a direct broadcast satellite (DBS) operator (e.g., DIRECTV) or a cable company. Such a pay-TV service provider may require a subscriber to utilize an integrated receiver decoder (IRD) 30 that enables the descrambling or decryption of the transmission downloaded from an antenna 32. The IRD may be configured to allow the viewing of one or more particular channels, programs, etc. based on a subscriber's payment or subscription.

As shown in FIG. 2, a typical MPEG packet 40 in the transport stream is of a fixed length, 188 bytes for standard DVB, of which the first 4 bytes contain header information 42 and the remainder is payload 44. The header includes among other things a sync byte "0x47", a payload_unit_start flag, the program ID (PID), and an adaptation_field_control flag. The PID is a number. The program guide defines what (audio, video, conditional access table, etc.) is on a given PID. If the adaptation_field_control flags are set, the packet contains an adaptation field and may contain a program clock reference (PCR) for the associated data stream. Traditionally, the PCR appears on the video stream but may appear on both audio and video or on a separate PID. If the payload_unit_start flag is high, the packet contains a PES header, which may contain a presentation time stamp (PTS). Each program including a video stream and/or one or more audio streams has an associated PCR that establishes its clock. The PTS is included in both the audio and video streams and tells the IRD at what time relative to the PCR to play the stream. The PES header may also include a decoder time stamp (DTS) that suggests when the decoder should start decoding to achieve the PTS. For complete description of the packet structure and transport stream see ISO/IEC 13818-1.

As shown in FIG. 3, the 1$^{st}$ generation MPEG encoders 50 utilized by DirecTV and produced by Compression Labs, Inc. (CLI) took synchronized audio/video (A/V) inputs 52 from various sources such that all sources had exactly the same frequency. Frame synchronization was typically accomplished by feeding a reference signal 54 along with the A/V inputs 52 to a frame synchronizer 56. Thereafter each program was encoded and multiplexed together. The Mux 58 had one 27 MHz MPEG clock reference 59 locked to a reference input video through either the sync pulses in analog video or a serial digital video in. A counter in clock reference 59 derived the PCR for each encoded codestream from that one clock. As a result, all of the programs were in sync with both the "frame" and "clock". However, because CLI's common MPEG clock approach required that all the inputs be synchronized and all the encoders are collocated with the Mux in a card cage it was not well accepted by customers and the approach was abandoned by the industry.

Current generation manufacturers such as Divicom, Thomson, and Motorola now produce MPEG Encoder/Program Mux boxes 60 that operate independently of one another as shown in FIG. 4 to encode a video and one or more audio inputs. Each box includes a separate MPEG clock reference 61 that is locked to the input video to generate a multiplexed program stream 62 with unique PCR and PTS time stamps. A counter simply counts tics of the clock reference to generate the time stamps. The PCR has an "epoch" or beginning of time where the counter is set to zero and then rolls over some time later, e.g. every 36 hours. The counters in different encoder boxes will have different epochs, and thus will not be encoder synchronized. A provider can use distinct encoder boxes for different (non-synced) sources of programming and a Mux 64 to multiplex the program streams together into the transport stream 22. A transport stream in which the programs are referenced off of different and independent PCRs supports normal "channel surfing" and does not have the constraints associated with frame and clock synchronization.

SUMMARY OF THE INVENTION

The present invention provides a system and method for merging of multiple encoded audio and video streams into a single program in the transport stream to enable playback of any audio stream with any video stream.

This is accomplished by first locking the frequency of audio and video input streams for a plurality of different programs to a source clock, independently encoding each program with its own PCR and PTS into a program stream, multiplexing the program streams into a transport stream, and then synchronizing the PCR and PTS of the program streams to a declared master PCR. The A/V streams can be frequency locked either by using frame synchronization or by providing a common source clock. The PCRs are synchronized by declaring one program and its PCR to be the master and comparing each slave PCR value to an interpolated value of the master PCR. The slave PCR is set to the interpolated value and the offset added to each occurrence of the PTS (or DTS). The offset may be time averaged to improve resolution in high jitter encoders. This approach can be used with currently existing 2$^{nd}$ generation hardware to enable playback of an audio stream from one program and encoder box with a video stream from another program and encoder box. Although this approach does require frequency locking of the input streams, it does not require a single encoder reference clock nor does it require collocation of the encoder boxes.

These and other features and advantages of the invention will be apparent to those skilled in the art from the following

BRIEF DESCRIPTION OF THE DRAWINGS

FIG. 6 is a diagram of a transport stream including multiple audio-video streams and their PCR and PTS;

FIG. 8 is a diagram of the transport stream in which the audio-video streams have been synchronized to the encoder clock;

DETAILED DESCRIPTION OF THE INVENTION

Figure 1:
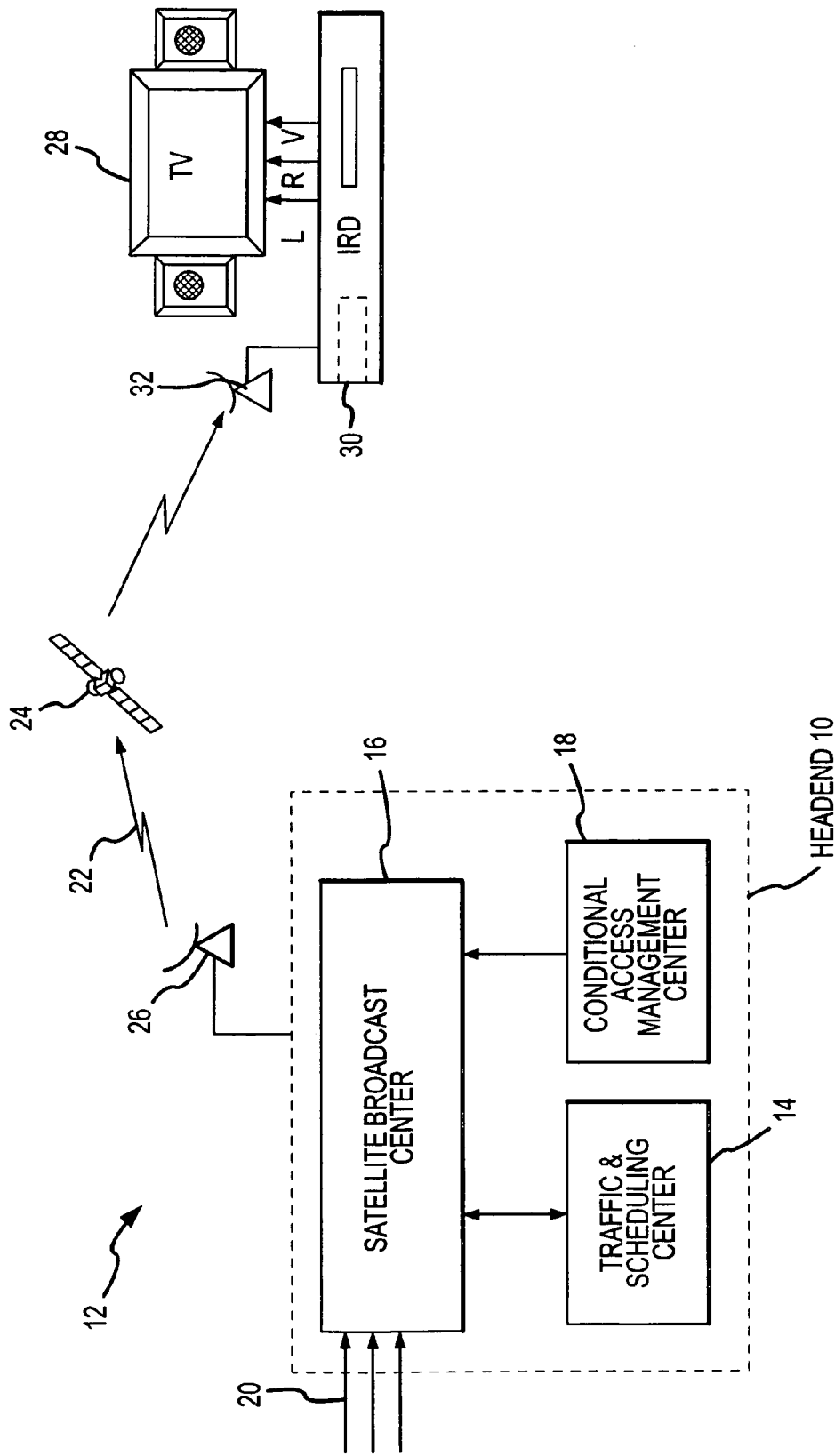
FIG. 1, as described above, is a simplified block diagram of a satellite broadcast system.
Figure 2:
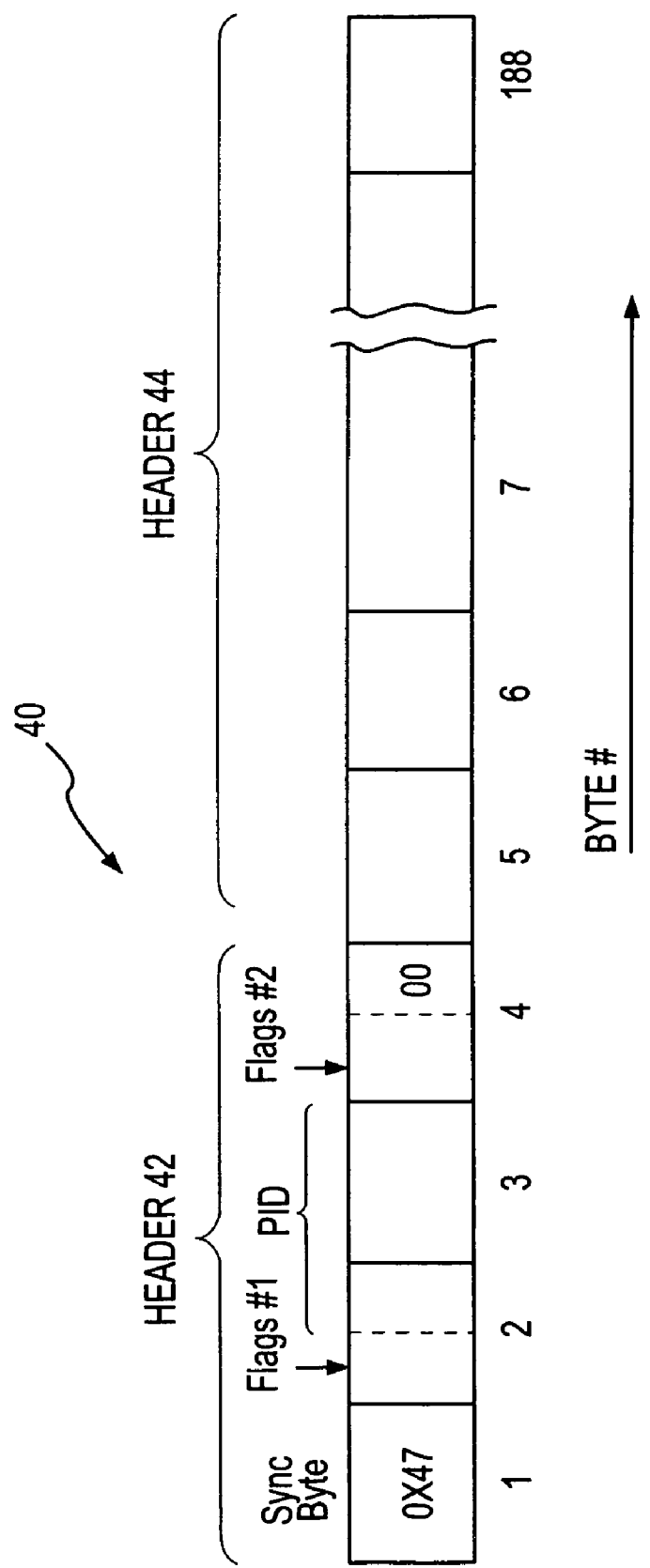
FIG. 2, as described above, is a diagram of an MPEG packet structure.
Figure 3:
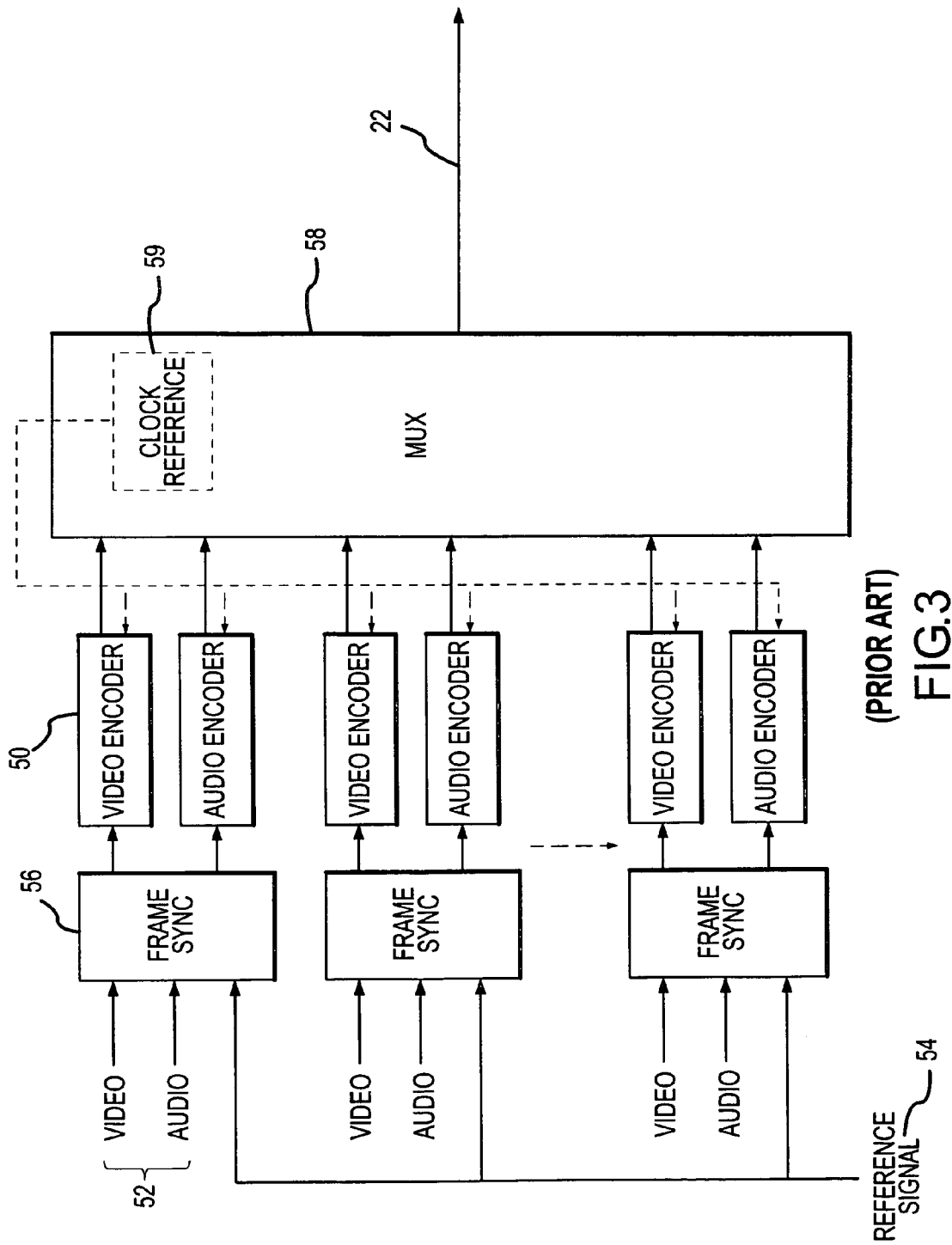
FIG. 3, as described above, is a block diagram of a $1^{st}$ generation MPEG encoder that encodes and multiplexes multiple audio and video streams into a transport stream using a single MPEG reference clock to generate the PCR and PTS.
Figure 4:
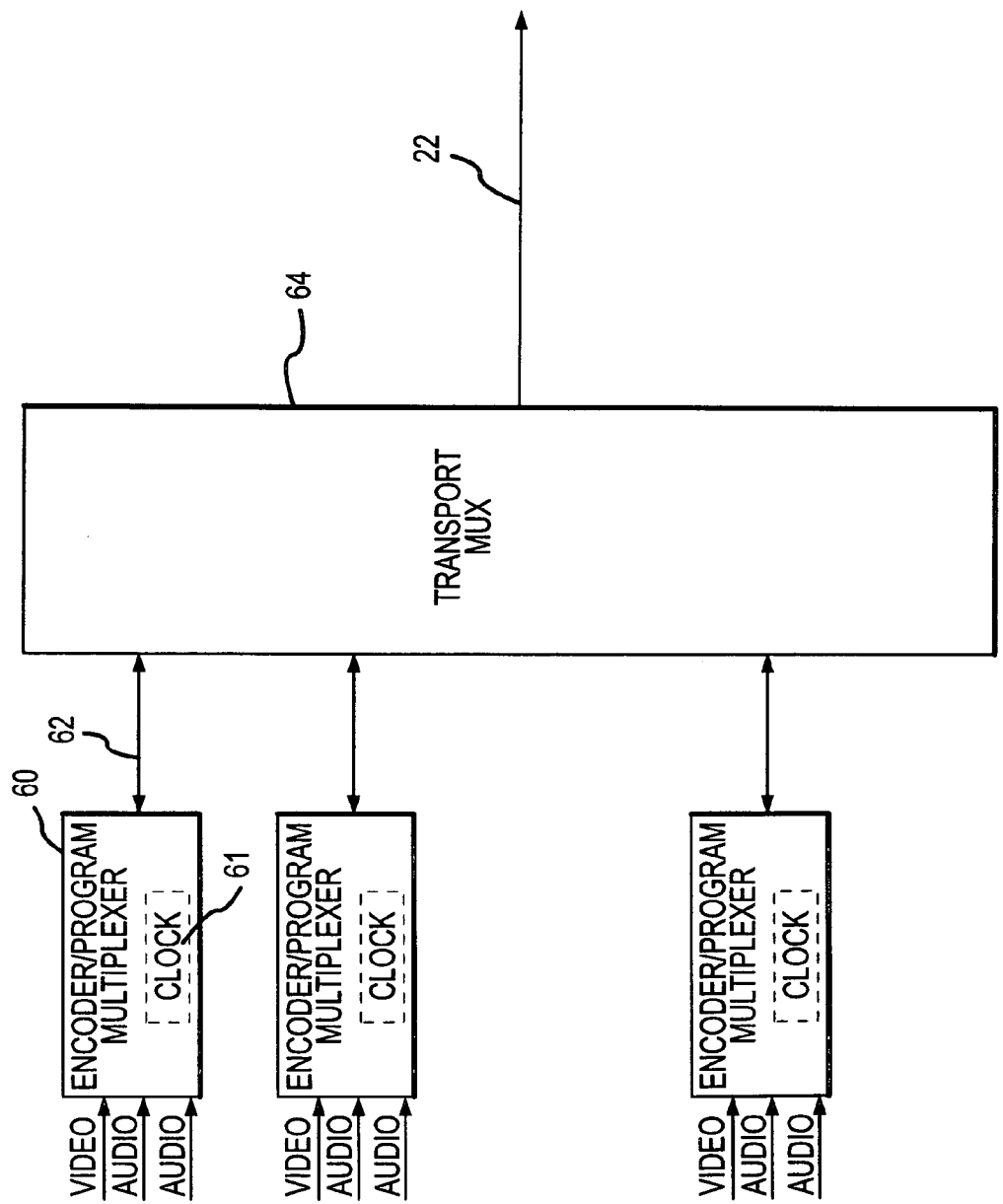
FIG. 4, as described above, is a block diagram of a plurality of $2^{nd}$ generation MPEG encoders that operate independently including separate MPEG reference clocks to generate program streams with unique PCR and PTS that are multiplexed into the transport stream.

Satellite and cable providers continue to expand television programming to include some special events such as NASCAR, NFL, concerts, etc. that include multiple video and audio inputs. In a NASCAR event, the view from the announcer, pit crew, driver and field and audio of the announcer, pit boss, driver and crowd may be available. Typically, the director cuts the various audio and video feeds to create the program that is broadcast. Using currently available technology, the A/V inputs could be made available to a consumer in assigned pairs as different programs. For example, the view from the car and driver commentary would be one program, the view from the pit and pit boss commentary would be a second program, and the director's cut of the available audio and video inputs would be the broadcast program. Each of these A/V inputs would be a separate program allowing the consumer to simply surf from one channel to the next. Neither frequency locking nor clock synchronization is required.

However, in some programming it may be desirable to provide the consumer with the flexibility to mix and match the audio and video inputs, permitting the viewer to be his or her own director. For example, the consumer could select the "view from the car" & "pit boss commentary". In order to do this, all of the sources must be both "source clock frequency locked" and "encoder (MPEG PCR) clock synced". Otherwise the consumer IRD cannot reliably decode and display the selected audio and video streams at the proper times. The variation in frame frequency may cause the audio and video streams from different programs to drift apart and could cause overflow or underflow in the buffer. A discrepancy in the PCR would cause the IRD to try to buffer the audio to play at the wrong time.

The currently installed encoder systems do not provide this type of synchronization. Notably, the original CLI hardware could be used to provide this mix and match capability. However, as noted above CLI's common MPEG clock approach was not well accepted by customers and was abandoned by the industry. Furthermore such an approach is not compatible with the existing installed hardware.

As shown in FIGS. 5-9, the existing hardware platform includes a number of encoder/program multiplexers 70, each having its own clock reference 72 taken from the video input, and a transport Mux 74. As described previously, each encoder encodes its audio and video inputs and generates a program stream 76 that includes a PCR and PTS for each input. The transport Mux 74 multiplexes the program streams into a transport stream 78 for transmission via antenna, cable or satellite 79.

The current invention builds on the existing hardware platform to frequency lock and clock synchronize the program streams 76 to effectively merge them into a single program in the transport stream 78. This allows a consumer, and the existing base of installed IRDs, to mix and match audio and video streams as if they were encoded using a single N-input encoder/transport Mux.

Figure 5:
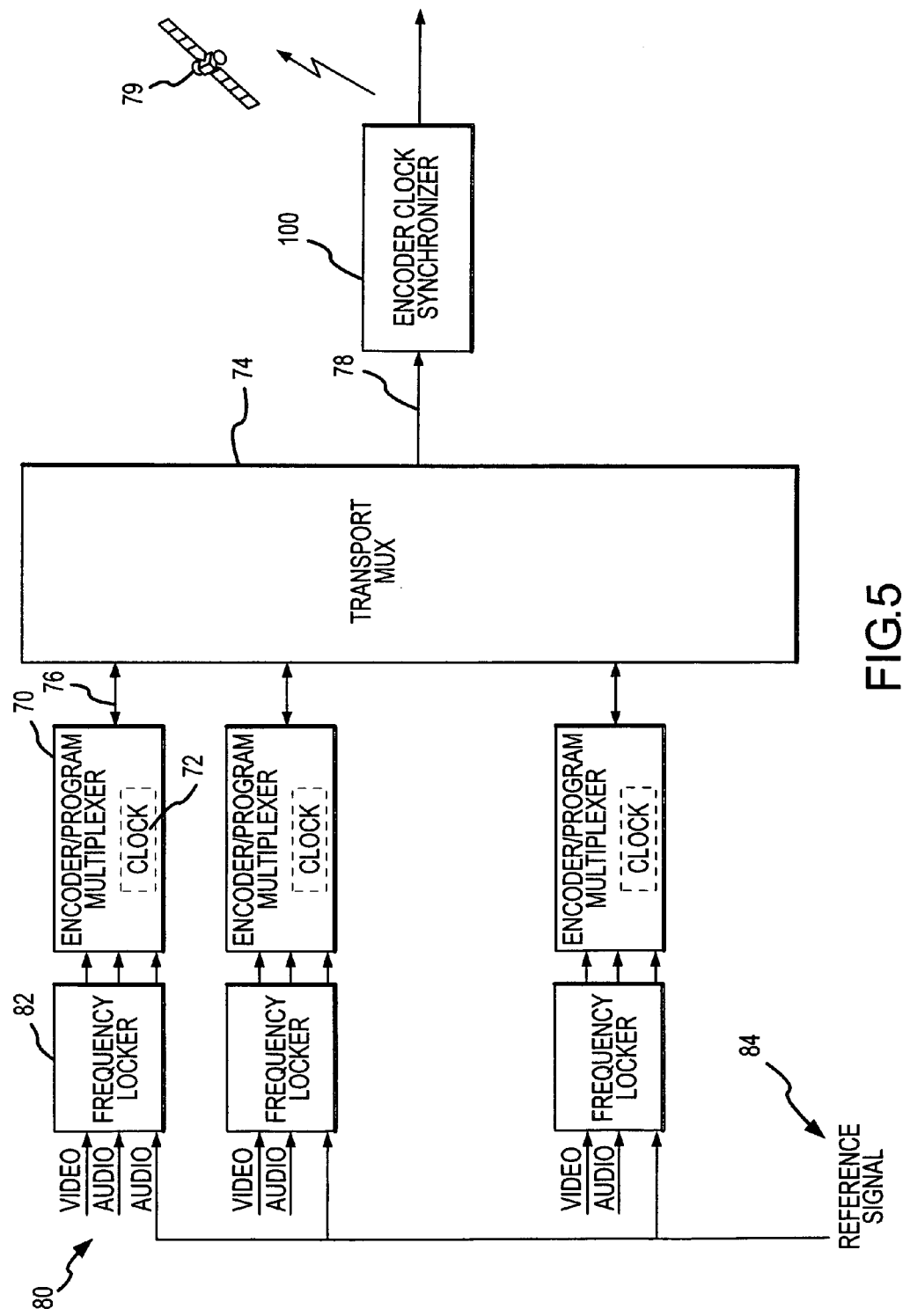
FIG. 5 is a block diagram of a system in accordance with the present invention for use with independently operated A/V encoders to merge the streams into one program with source clock frequency locked and encoder clock synchronized.
Figure 10:
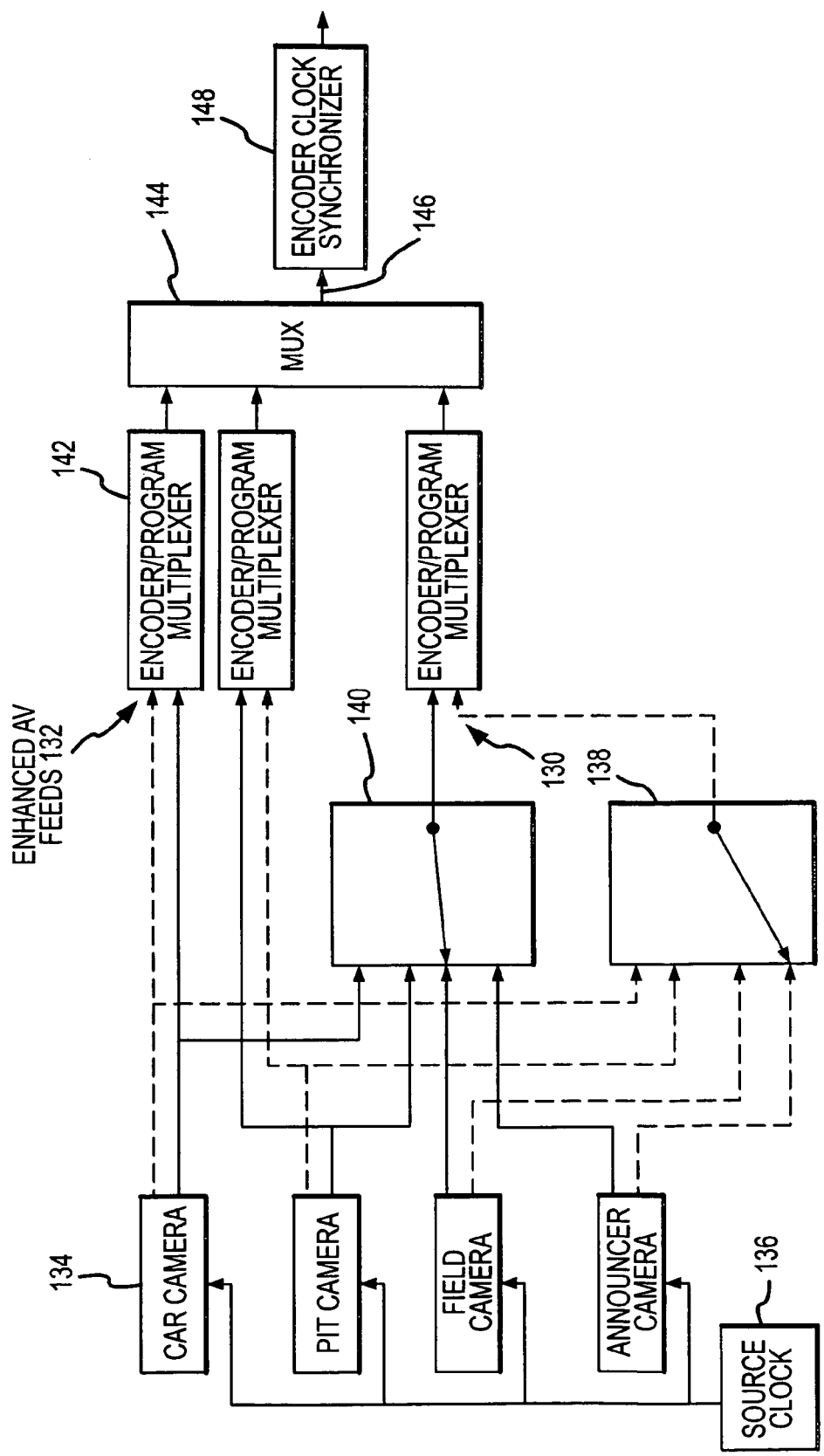
FIG. 10 is a block diagram for event programming providing enhanced video feeds in addition to the normal program feed from which a customer may select.

The audio and video streams can be source clock frequency locked in one of two ways. As shown in FIG. 5, the unlocked audio and video streams 80 for each program are input to a frequency locker 82 together with a common reference signal 84, e.g. a 27 MHz clock. Using techniques well known in the industry such as a synchronizer (Grass Valley Group Inc Gecko® series, Ensemble Designs Signal Acquisition Series® and Leitch Inc DPS® series), the locker locks the frequency of all the inputs to the reference signal. Note, the frequency locker may, and typically does, provide video phase locking as well, in which case the operation is referred to as "frame synchronization". Alternately, as shown in FIG. 10, the inputs can be frequency locked by referencing video capture, e.g. the cameras, off of a common source clock.

FIG. 6 illustrates a transport stream 78 containing at least two programs "X" and "Y", each of which are time stamped with PCR and PTS values in the payload of packets 90 for a video and audio input. For purposes of illustration only, a transport rate of 40,608,000 bits/sec and 27,000 packets/sec is used. This equates to 1,000 27 MHz ticks/packet. Note, 1,000,000 ticks represents only approximately 0.037 seconds in this example. In general, the PCR leads the PTS by a sufficient amount of time (clock ticks) to allow the IRD to extract, decrypt and decode the selected audio and video streams for playback at the designated PTS. Although the PTSs (PTS X-V and PTS X-A) for the video frame and audio segment are typically close together they are typically not the same. The playback of the audio will not generally be precisely aligned with the presentation of the video frame.

In this example, the first PCR for program X has a value of 1,000,000 ticks and the PTS for the video and audio streams are 2,000,000 and 1,901,000, respectively. The first PCR for program Y has a value of 10,000,000 ticks due to the different epochs in the separate encoders and the PTS for the video and audio streams are 12,000,000 and 11,860,000, respectively.

Figure 7:
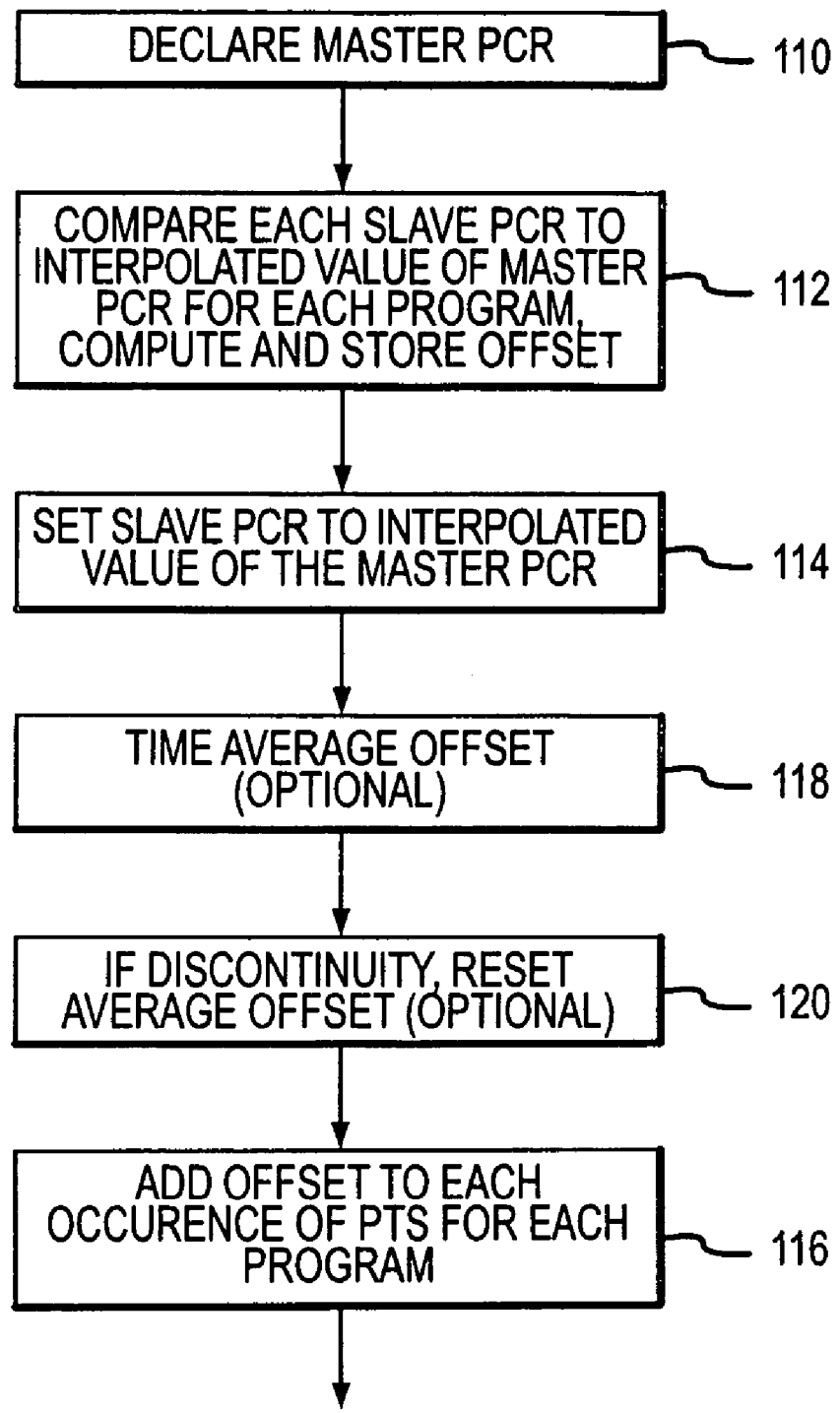
FIG. 7 is a flowchart of the process for synchronizing the encoder clocks.

To synchronize these program streams to the encoder clock, an encoder clock synchronizer 100 synchronizes the programs' PCR and PTS values in the transport stream off of a declared master PCR in one of the program streams to merge them into one program. As illustrated in FIG. 7, the encoder clock synchronizer declares one program (program X) and its PCR to be the master (step 110). The synchronizer compares each slave (program Y) PCR value to an interpolated value of the master PCR and computes and stores the offset (step 112). The slave PCR is set to the interpolated value (step 114) and the offset added to each occurrence of the PTS (or DTS) (step 116).

The synchronizer suitably processes the transport stream time sequentially a packet at a time. For example, the synchronizer will read a packet header and determine that the master PCR-X is included in the payload. The synchronizer reads and stores the PCR value e.g., 1,000,000 and then counts the number of packets until a next PCR or PTS is detected. In this case, the next time stamps are the PTS X-V (video) and PTS X-A (audio) values, which remain unchanged at 2,000,000 and 1,901,000 respectively. The synchronizer next encounters PCR Y four packets away from PCR X. The interpolated value for program X is 1,000,000+4 packets * 1,000 ticks/packet or 1,004,000 tics as shown in FIG. 8. The current offset is 1,004,000-10,000,000 or −8,996,000 tics. The synchronizer then detects the PTS Y-V and PTS Y-A values to which it adds the offset to get values of 3,004,000 and 2,864,000 respectively, which are now referenced to the master PCR. This process is repeated for each slave program with each being referenced against the master as it is encountered time sequentially. Alternately, given sufficient memory, the data can be processed on a program-by-program basis instead of sequentially. Regardless, the result is a single master PCR against which the PTS for all the audio and video streams are referenced.

The offset may be time averaged to improve resolution (step 118). The clock should advance at the exact consistent rate of 27,000,000 ticks per second. This is generally true, however, some manufacturers only keep to the 27 mega ticks per second rate as a long term average and in the short term, the PCR might vary a few thousand ticks variation from sample to sample. This is called PCR jitter. MPEG has a specification that permits PCR jitter to upwards to two seconds, however in practice; IRDs will not tolerate much jitter. By averaging the difference it makes it so the jitter from the main channel does not increase the jitter on the slave channel. Consequently, doing averaging is only important to make things work with 'brand X' encoders. This step is not at all necessary for properly designed low jitter encoders. The window size was selected to be approximately one second to match the behavior of 'brand X' encoders, however given a worse case MPEG encoder the window might go as high as two seconds. The typical value of the window size is zero, since most encoders are relatively jitter free PCRs. If a discontinuity is detected between the average and the current value of the offset, the time averaged offset is reset to the current offset (step 120). This may occur if, for example, an encoder is taken off-line and replaced with another encoder having a different EPOC.

Figure 9:
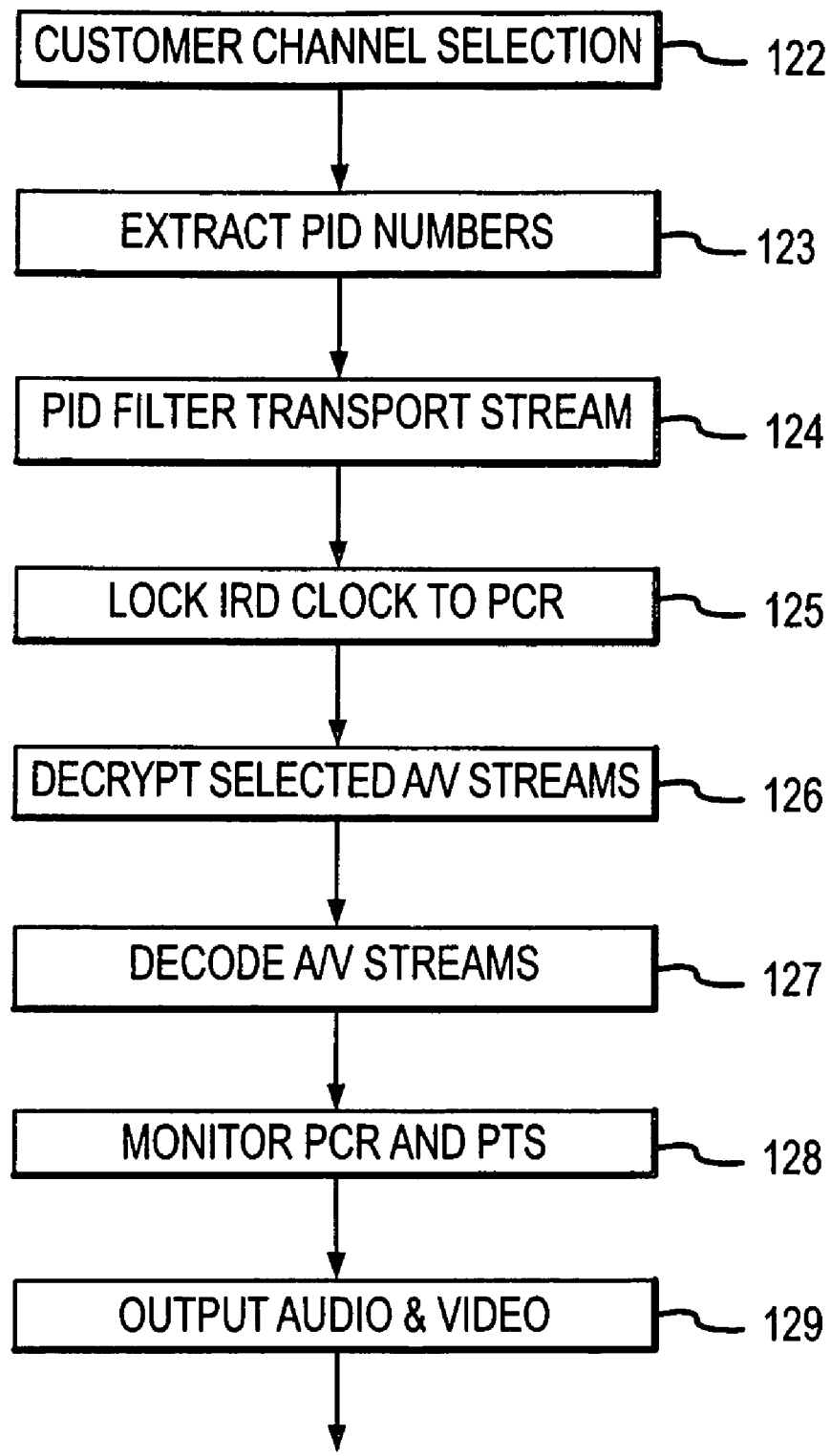
FIG. 9 is a flowchart illustrating the process of decoding the transport stream to playback video from one program with the audio from another program.

As illustrated in FIG. 9, the source clock frequency locked and encoder clock synchronized transport stream enables a customer to select the video stream from one program (Program X video) and the audio stream from another program (Program Y video) and play them back together as if they were encoded by the same encoder. Using the remote, the customer would view the program guide and select a desired channel (step 122). The program guide might, for example, list channel 800 "NASCAR Broadcast", channel 801 "car video, pit audio", channel 802 "pit video, car audio", etc. where a channel has been assigned to each of the supported combinations of audio and video. Thereafter, the IRD extracts PID numbers for the selected audio and video, and PCR if it is on a separate PID (step 123). The IRD "PID filters" the transport stream (step 124) to extract the selected audio and video streams, and PCR if separate. The IRD locks its internal clock to the PCR by loading the next PCR value into its counter and continuing to count (step 125). The IRD decrypts the audio and video streams (step 126). The IRD decodes the audio and video streams (step 127) and stores the data in respective buffers. A display processor monitors the PCR via the internal counter and the PTSs (step 128) and outputs the audio and video to the playback device(s) (step 129). The IRD continually loads the next PCR value into its counter and the process is repeated until the customer changes channels. At that point, the IRD extracts different audio and video streams and continues on. The described procedure is a simplified version of IRD operation to illustrate the relevant steps. Not all IRDs function in exactly the same manner but do embody the procedure for extracting the PCR and PTS and playing back the desired audio and video.

In the current example, the customer selects a channel corresponding to Program X video and Program Y audio. The IRD extracts the corresponding PID numbers and filters transport stream to extract only those packets. The IRD extracts a PCR value of 1,000,000 and loads it into its 27 MHz counter. The IRD decrypts and then decodes only the Program X video frame and Program Y audio segment and stores the data in a buffer. The IRD monitors the PCR via its internal counter and when it reaches 2,000,000 outputs the Program X video frame. Similarly when the counter reaches 2,864,000, the IRD outputs Program Y audio segment.

In an alternate embodiment, a customer may select more than one video stream and/or more than one audio stream for concurrent playback. For example, two or more videos may be simultaneously displayed using a picture-in-picture or montage functionality. A customer may select a primary audio stream for normal playback and a secondary audio stream that is intermittently played over the normal audio. Alternately, different audio streams could be directed to different speakers.

As mentioned previously this process can be applied to any programming content to provide a master PCR against which all the PTS are referenced. However, the process is particularly applicable to "live" event programming in which a director receives multiple "frame synced" feeds that he/she ordinarily cuts back & forth to mix and match the audio and video feeds to produce the one broadcast feed that a consumer ordinarily watches. As a result, the enhanced A/V feeds can be processed and delivered to consumers that have the proper subscriptions and hardware.

FIG. 10 illustrates a possible configuration for a live NASCAR race to provide both the normal program feed 130 and enhanced A/V feeds 132. In this example, four different cameras 134 (car, pit, field and announcer) capture audio and video. The cameras are all referenced off a common source clock 136 and thus are frame synchronized. All of the audio and video feeds are routed to a director's audio switch 138 and a director's video switch 140, respectively. The director uses the switches to mix and match the different audio and video feeds to create the normal program feed 130. The car and pit feeds are separately provided as enhanced A/V feeds 132. The various feeds are input to encoder/program multiplexers 142 to generate respective program feeds having independent PCR and PTS as described previously. A transport multiplexer 144 multiplexes the program feeds to generate a transport stream 146. An encoder clock synchronizer 148 synchronizes the programs' PCR and PTS values in the transport stream off of a declared master PCR in one of the program streams to merge them into one program. As a result, a normal customer can receive and watch the normal program feed. A customer who has subscribed to the special event can access the enhanced A/V fees and act as his or her own director to mix and match all of the audio and video feeds as desired.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method, comprising:
   frequency locking the audio and video streams from a plurality of programs;
   using independent encoder/program multiplexers, each having its own clock reference, to separately encode and multiplex each program's audio and video streams into a program stream, each program stream having an independent program clock reference (PCR) and audio and video presentation time stamps (PTS) in the audio and video streams;
   multiplexing the program streams into a transport stream; and
   synchronizing the programs' PCR and audio and video PTSs in the transport stream from a declared master PCR while avoiding feedback to any of the encoder/program multiplexers in one of the program streams to merge the programs' PCR and audio and video PTSs into one program having the master PCR against which the PTSs for all the audio and video streams are referenced, wherein the programs' PCR and PTS are synchronized by declaring one program and its PCR to be the master PCR and the remaining programs and their PCRs to be slaves, comparing each slave PCR to an interpolated value of the master PCR to compute an offset, setting the slave PCR to the interpolated value, and adding the offset to each occurrence of the slave's PTS.

2. The method of claim 1, wherein the audio and video streams are frequency locked by providing a single source clock to capture the streams.

3. The method of claim 1, wherein the audio and video streams are frame synchronized to both frequency and phase lock the streams.

4. The method of claim 1, wherein the programs' PCR and PTS are synchronized sequentially.

5. The method of claim 1, wherein the offsets for each slave program are time averaged.

6. The method of claim 1, further comprising:
   transmitting the transport stream to a customer site, in response to a customer command selecting a video stream from a program stream and an audio stream from a different program stream, extracting the selected audio and video streams, the master PCR and the audio and video PTSs from the transport stream,
   decoding the selected audio and video streams as if they came from the same program stream, and
   in accordance with the PTSs for the audio and video with respect to the master PCR, playing back the audio and video streams in frequency and time synchronization.

7. The method of claim 5, wherein, if a discontinuity is detected between the time-averaged offset and the current offset, resetting the time averaged offset to the current offset.

8. The method of claim 6, wherein the customer selects a plurality of video streams and/or a plurality of audio streams from different program streams for playback.

9. A method, comprising:
   receiving a transport stream comprising multiplexed program streams each of which comprise an encoded video stream, an encoded audio stream, a program clock reference (PCR) and audio and video presentation time stamps (PTS), wherein said video streams are source clock frequency locked and said PCRs are encoder clock synchronized to a master PCR against which the PTSs for all the audio and video streams are referenced, wherein the programs' PCR and PTS are synchronized by declaring one program and its PCR to be the master PCR and the remaining programs and their PCRs to be slaves, comparing each slave PCR to an interpolated value of the master PCR to compute an offset, setting the slave PCR to the interpolated value, and adding the offset to each occurrence of the slave's PTS,
   in response to a customer command selecting a video stream from a program stream and an audio stream from a different program stream, extracting the selected audio and video streams, the master PCR, and the audio and video PTSs from the transport stream,
   decoding the selected audio and video streams as if they came from a common program stream, and
   in accordance with the PTSs for the selected audio and video streams with respect to the master PCR, playing back the selected audio and video streams in frequency and time synchronization.

10. The method of claim 9, wherein the custom selects a plurality of video streams and/or a plurality of audio streams from different program streams for playback.

11. The method of claim 9, wherein the audio and video streams are decoded by,
   locking an internal clock of the decoder to the master PCR by loading the next PCR value into its counter and continuing to count,
   decoding the selected audio and video streams,
   storing the decoded audio and video streams in respective buffers, and
   monitoring the master PCR via the counter and the PTSs to output the audio and video streams to the playback device.

12. An apparatus, comprising:
   a frequency locker that frequency locks the audio and video streams from a plurality of programs;
   a plurality of independent encoders each having its own clock reference, each encoder encoding and multiplexing a different said program's audio and video streams into a program stream, each program stream having an independent program clock reference (PCR) and audio and video presentation time stamps (PTS) in the audio and video streams;
   a transport multiplexer that multiplexes the program streams into a transport stream; and
   an encoder clock synchronizer that, without feedback to any of the encoder/program multiplexers, declares one program and its PCR to be the master and the remaining programs and their PCRs to be slaves, and synchronizes the programs' PCR and audio and video PTSs in the transport stream from the declared master PCR in one of the program streams while avoiding feedback to any of the encoder/program multiplexers by comparing each slave PCR to an interpolated value of the master PCR to compute an offset, setting the slave PCR to the interpolated value, and adding the offset to each occurrence of the slave's PTS, to merge the programs' PCR and audio and video PTSs into one program having the master PCR against which the PTS for all the audio and video streams are referenced.

13. The apparatus of claim 12, wherein the frequency locker comprises a single source clock used to capture the audio and video streams.

14. The apparatus of claim 12, wherein the frequency locker comprises a plurality of frequency lockers that receive the respective programs and a common reference signal.

15. The apparatus of claim 12, wherein the encoder clock synchronizer synchronizes the programs' PCR and PTS sequentially.

16. The apparatus of claim 12, wherein the encoder clock synchronizer time averages the offsets for each slave program.

17. The apparatus of claim 12, further comprising:
   a communication channel for transmitting the transport stream to a plurality of user sites, each user site comprising,
      a receiver for receiving the transport stream,
      a user selection device for selecting a video stream from a program stream an audio stream from a different program stream to extract the selected audio and video streams, the master PCR and the audio and video PTSs from the transport stream;
      a decoder for decoding the selected audio and video streams as if they came from the same program stream; and
      a playback device for playing back the audio and video streams in frequency and time synchronization.

18. The apparatus of claim 17, wherein the decoder executes the following steps to decode the audio and video streams,
   locking an internal clock of the decoder to the master PCR by loading the next PCR value into its counter and continuing to count,
   decoding the selected audio and video streams,
   storing the decoded audio and video streams in respective buffers, and
   monitoring the master PCR via the counter and the PTSs to output the audio and video streams to the playback device.

19. The apparatus of claim 16, wherein, if a discontinuity is detected between the time averaged offset and the current offset, the encoder clock synchronizer resets the time averaged offset to the current offset.

\* \* \* \* \*